United States Patent [19]

Wang

[11] Patent Number: 5,203,745
[45] Date of Patent: Apr. 20, 1993

[54] INNER AND OUTER CHAIN PLATES FOR BICYCLE HAVING MULTIPLE WHEELS

[76] Inventor: Wen B. Wang, #67 Kong Ko, Kong Nang Village, An Ding Hsiang, Tainan Hsien, Taiwan

[21] Appl. No.: 880,599

[22] Filed: May 8, 1992

[51] Int. Cl.⁵ .............................................. F16G 1/24
[52] U.S. Cl. ................................... 474/206; 474/213
[58] Field of Search ....................... 474/206, 212-217

[56] References Cited

U.S. PATENT DOCUMENTS

| | | | |
|---|---|---|---|
| 1,086,146 | 2/1914 | Dodge | 474/213 X |
| 1,094,200 | 4/1914 | Dodge | 474/213 |
| 1,115,431 | 10/1914 | Howson | 474/213 |

Primary Examiner—Thuy M. Bui
Attorney, Agent, or Firm—Morton J. Rosenberg; David I. Klein

[57] ABSTRACT

An inner and an outer plates for bicycle having multiple wheels of the present invention is to partially deform the inner plates and outer plates. The inner plates of the present invention have extending two triangular protuberances at respective edges of a reduced portion with the top marginal edge of each closed to the edges. The outer plates of the present invention have also extending a pyramidal protuberance from a reduced portion at one side thereof, with the respective bottom ends extending out of a portion therefrom.

3 Claims, 4 Drawing Sheets 6-6

7-7

8-8

INNER AND OUTER CHAIN PLATES FOR BICYCLE HAVING MULTIPLE WHEELS

BACKGROUND OF THE INVENTION

This invention is in relate to a wheel chain plate of a bicycle. More particularly, an inner plate and an outer plate being linked to an endless wheel chain to be used on bicycles having multiple wheels.

Chains of various types have been adapted on bicycle as part of the transmission mechanism. Those chains are basically composed of inner link plates and outer link plates connected in longitudinal alternation thereof by means of pins. The distance between each link pairs has a direct relationship of the diameter, thickness and number of tooth. It is a trend to increase freewheel (rear speed change gear) and chain wheel (front speed change gear). However, regardless of increasing of the number of either the freewhel or the chain wheel, the wheel base of each bicycle has a standard specification which may not be changed in accordance with the number of the wheels. In order to have more wheels installed on a bicycle, sprockets are made thinner than before which has made the engagement of the chain plate and sprocket easily but loosely, and is likely to fail to mesh with each other when riding on a bumping road.

In view of this, the inventor has invented the present invention which enables the mesh between the sprocket and wheel chain easily and firmly.

SUMMARY OF THE INVENTION

It is the primary object of the present invention to provide an inner and an outer chain plate for bicycle having multiple wheels, each of which has offset a portion at inner end to minimize the clearance between the teeth of the sprocket and the chain plates and also prevent skipping-over of the chain from the sprockets, resulting in that the chain mis-shifted over a selected sprocket onto an undesired sprocket.

It is an other object of the present invention to provide an inner and an outer chain plate for bicycle having multiple wheels which plates have cutout in a slanting direction which formed a guiding surface so that link plates can easily ride over a top of a tooth of any selected sprockets.

It is a further object of the present invention to provide an inner and an outer chain plate for bicycle equipped with derailleur mechanism which has decreased the improper fraction and increased its service life thereafter.

DETAILED DESCRIPTION OF THE PREFERRED EMBODIMENT

Figure 1:
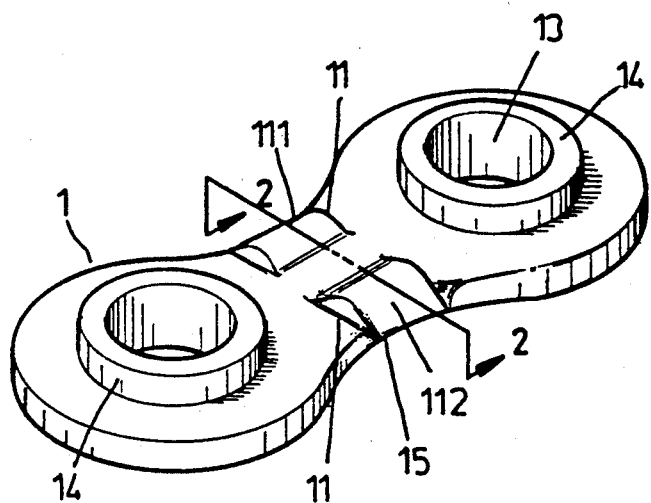
FIG. 1 is a perspective view of an inner chain plate of the present invention.
Figure 2:
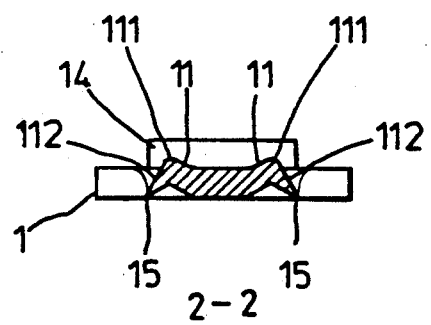
FIG. 2 is a sectional view taken along line A—A of FIG. 1 thereof.

Referring now to the drawings wherein the showings are for the purpose of illustrating a preferred embodiment of the invention only and not for the purpose of limiting the same, FIGS. 1 & 2 shown an inner chain plate 1 of the present invention which composes of two apertures 13 at respective ends thereof, a boss 14 offset from one side which side is defined as inner surface, a reduced portion 15 at the center of the inner chain plate 1 and extending therefrom two triangular protuberances 11 at respective ends of the reduced portion of the inner side. Two guide surfaces 111, 112 are defined by the surfaces extending downward and outwardly from respective top margine edges 111 of the protuberances 11 to the respective outer marginal edges. An entrance or lead-in is defined thereafter by link pair link plates, this entrance facilitate the engagement of the teeth 5 of sprocket with the chain.

Figure 3:
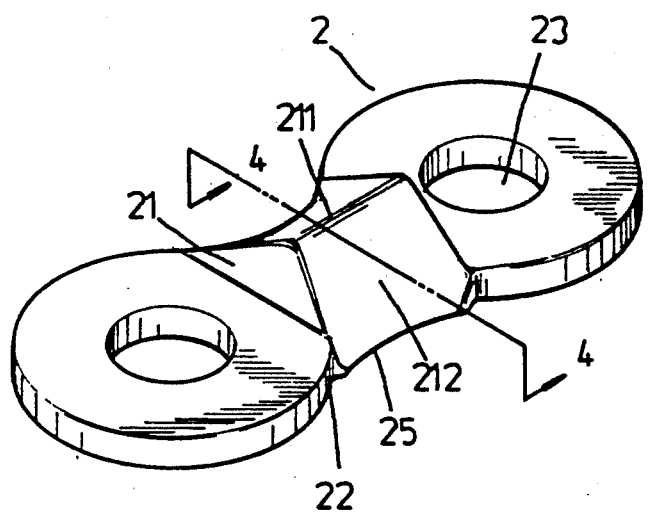
FIG. 3 is a perspective view of an outer chain plate of the present invention.
Figure 4:
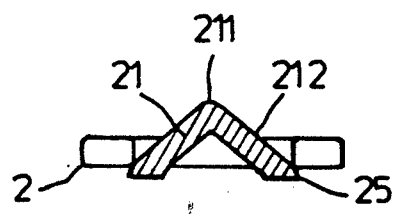
FIG. 4 is a sectional view taken along line B—B of FIG. 3 thereof.
Figure 5:
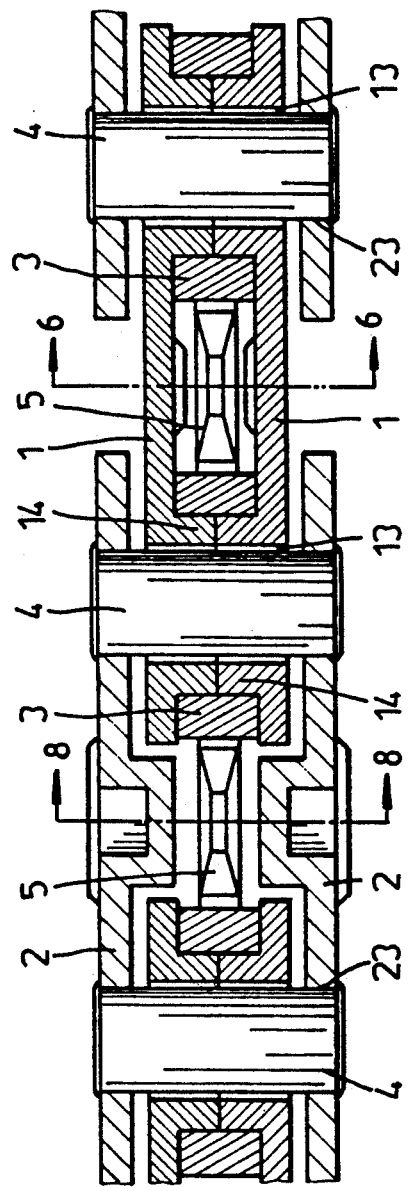
FIG. 5 is an enlarged fragmentary top view showing a part of a bicycle chain being meshed with a sprocket according to the invention.

FIGS. 3, 4 show the outer chain plate 2, according to the present invention, includes a reduced portion 22 at middle portion thereof, two apertures 23 at respective ends, and a pyramidal protuberance 21 offset from respective edges of the reduced portion 22 of one side of the outer plate 2, which side is defined as inner surface, and has extending downwardly from a top marginal edge 211 to respective bottom marginal edges each of which has extending a portion over the edge of the side opposing the inner surface. The respective inclining surfaces of the protuberance 21 are defined as guide surfaces 25 which facilitates the chain to catch and ride across a top of an accessible tooth 5 of the sprocket. When a chain is shafting either from a small sprocket to a large sprocket or vise versa, a certain leading part of the chain must behave so as to climb up one side wall of the sprocket to be shifted, hence the wider the entrance is, the easier the chain to catch and to ride on the tooth.

When assembly, a pair of inner plates 1 are placed in parallel with their inner surface facing inwardly and the bosses 14 at respective ends of each inner plate 1 are interposed with an ends of two rollers 3 therein, respectively, and whereas the other ends of the rollers 3 are interposing into the bosses 14 of the other inner plate 1. Secondly, a pair of outer plates 2 are placed in parallel and partially in overlying relationship with respect to each of the inner plates 1 of the neighboring inner plates 1 in such that one end of each outer pair plates 2 is connected to one end of each inner pair plates 1 by means of known pins 4.

Figure 6:
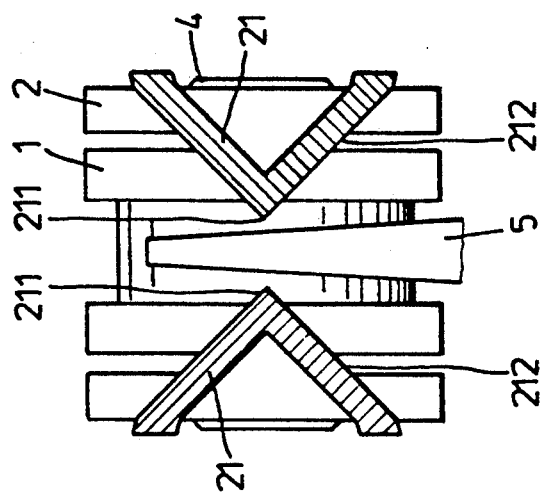
FIG. 6 is an enlarged sectional view taken along line C—C of FIG. 5 showing the sprocket is fully interposed between two inner plates.
Figure 7:
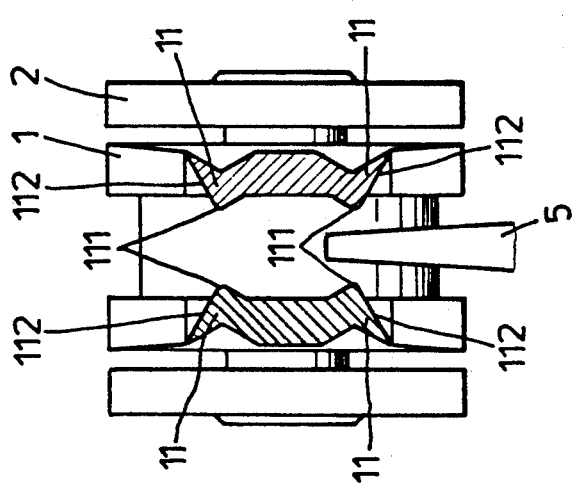
FIG. 7 is an enlarged sectional view taken along line C—C of FIG. 5 showing the sprocket is halfway interposed between the inner plates.

Referring now to FIGS. 6 & 7 which are side sectional views showing the relationship between the inner pair plates 1 and the tooth 5 of sprocket. Upon interposing between a linked inner pair plates 1, the tooth 5 is securely catched by the protuberances 11. Even though that the tooth 5 has interposed only halfway between the linked inner pair plates 1 due to riding on a bumping road, the protuberances 11 at one end of each plate 1 can still hold the tooth 5 firmly.

Figure 8:
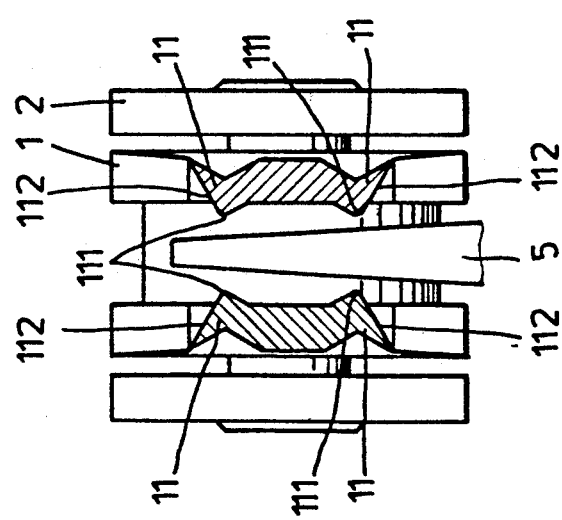
FIG. 8 is an enlarged sectional view taken along line C—C of FIG. 5 showing the sprocket is fully interposed between two outer plates.

In regards to to the engagement of the linked outer pair plates 2 and the tooth 5, as shown in FIG. 8, the protuberances 2 of the linked outer pair plates 2 have relatively shortened the distance between the protuberances 21 and the tooth 5.

I claim:

1. Inner and outer plates for bicycle having multiple wheels comprising essentially a plurality of inner plates and outer plates; each of said inner plates have two triangular protuberances extending on respective edges of a reduced portion at one side thereof, and having formed thereon two guiding surfaces from the top marginal edges to the outer marginal edges of said protuberances; said outer plates have also a pyramidal protuberance extending upwardly from a reduced portion at one side thereof and are defined as guiding surfaces; each said bottom marginal edge of said outer plate being extending a portion out of the bottom edge of said plate.

2. Inner and outer plates for bicycle having multiple wheels of claim 1, wherein said top marginal edges of said inner plates are in parallel with a longitudinal direction and are located at respective ends thereof.

3. Inner and outer plates for bicycle having multiple wheels of claim 1, wherein the top marginal edge of each outer plates is in a direction parallel with the longitudinal of said outer plate located at center portion thereof.

* * * * *